United States Patent [19]

Thevenaz

[11] 3,751,148

[45] Aug. 7, 1973

[54] CINEMATOGRAPHIC PROJECTOR

[75] Inventor: Louis Thevenaz, Les Rasses, Switzerland

[73] Assignee: Balex International S.A., Vaud, Switzerland

[22] Filed: Oct. 5, 1971

[21] Appl. No.: 186,285

[30] Foreign Application Priority Data
Oct. 19, 1970 Switzerland.................... 15389/70

[52] U.S. Cl..................... 352/123, 352/8, 352/158, 242/192, 242/195
[51] Int. Cl. ............................................. G03b 21/04
[58] Field of Search ...................... 352/123, 6, 7, 8, 352/9, 10, 157, 158; 242/192, 195

[56] References Cited
UNITED STATES PATENTS

| 3,480,354 | 11/1969 | Fukuda............................ 352/123 |
| 3,550,879 | 12/1970 | Bundschuh ..................... 352/123 X |
| 3,552,683 | 1/1971 | Bundschuh ..................... 352/158 X |

FOREIGN PATENTS OR APPLICATIONS

| 1,218,054 | 12/1959 | France............................... 352/123 |

Primary Examiner—Samuel S. Matthews
Assistant Examiner—Monroe H. Hayes
Attorney—Emory L. Groff et al.

[57] ABSTRACT

A cinematographic projector comprises a light source, an objective, a film drive mechanism, a movable support for cassettes containing a spool of film, a temporary receiving member for the projected film, and a control mechanism for these devices. The movable support of the cassettes is displaceable horizontally in a direction perpendicular to the optical axis of the objective and comprises vertical compartments juxtaposed in the direction of displacement of the movable support and open at their upper end. Each compartment includes adjacent one end of its open upperedge, a first support member around which the cassette can pivot and a second support member withdrawing when the compartment is placed in extension of the optical axis of the projector. The cassettes in waiting position above the compartments and resting on the first and second support members tilt into their respective compartment around the first support member and are placed in film delivery position when the compartment is brought into the extension of the optical axis of the projector.

11 Claims, 6 Drawing Figures

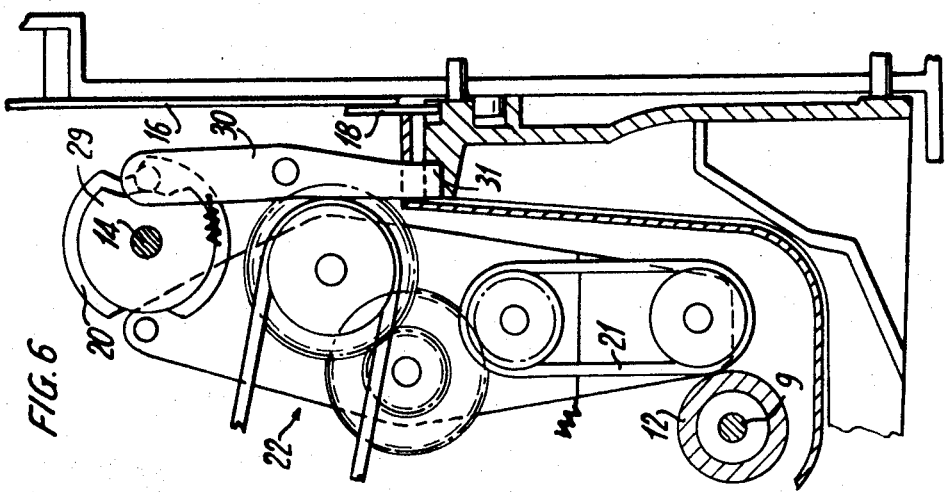
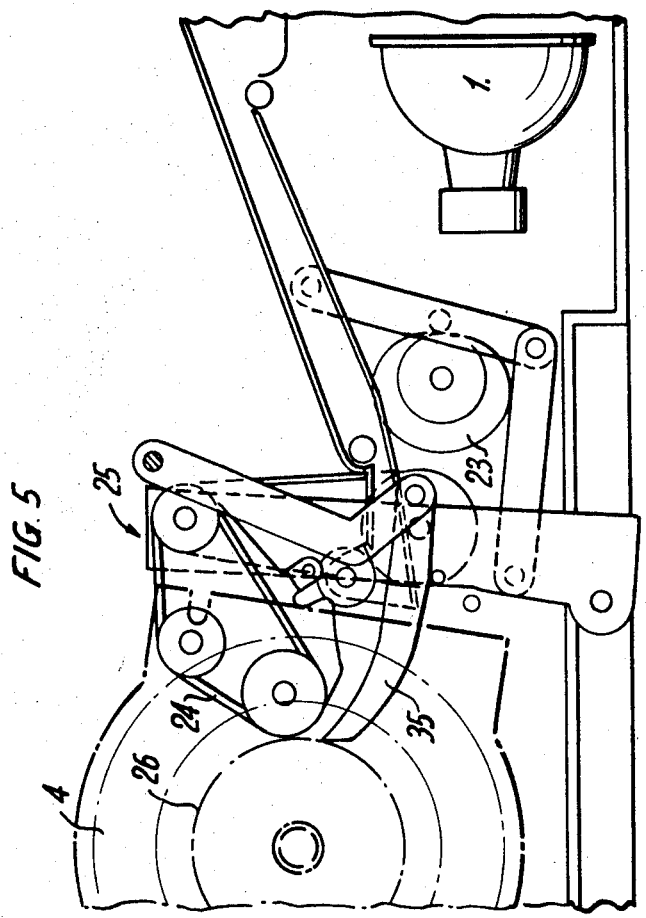

CINEMATOGRAPHIC PROJECTOR

Numerous cinematographic projectors intended for amateurs are devised to utilise cassettes each containing a spool of film. They are generally provided with a film extraction device automatically directing the free end of the film towards the film drive elements and the receiver spool. The user is thus spared having to manually position the film for projection in the projector. Similarly, the rewinding of the film, after its projection, can be triggered automatically, so that the user has only to substitute a new cassette for the cassette containing the film which has been projected, to continue the projection session.

Even the latter operation has been automatised in recent cinematographic projectors equipped with a charger in which numerous cassettes, intended to be projected successively, are disposed in waiting arrangement. One known charger is a compartmented movable support, transversely displaceable with regard to the optical axis of the projector and in the direction of the latter to bring successively into projection position cassettes arranged parallel to one another and to the optical axis of the projector in the said compartment. However, in order to enable the rewinding of the film after its projection, the cartridges are engaged simultaneously on a fork passing through the axial orifice of the spools on positioning the charger. It is hence impossible to substitute in such a charger one cassette for another in the course of projection.

It is an object of the invention to overcome this drawback.

According to the invention, there is provided a cinematographic projector comprising at least one light source, an objective, a film drive mechanism, a movable support for cassettes each containing a spool of film for projection, a temporary receiver member of the projected film, and a control mechanism for these devices, of the type in which the said movable support of the cassettes is displaceable horizontally in a direction perpendicular to the optical axis of the objective and comprises vertical compartments juxtaposed in the direction of movement of the movable support and open at their upper end.

This projector is characterised in that each of the said compartments comprises, in the vicinity of one of the ends of its open upper edge, at least one first support member for the cassette, around which the cassette can pivot, and a second support member for the cassette withdrawing when the said compartment has been placed in the extension of the optical axis of the projector, the whole being such that the cassettes arranged in waiting position above the said compartments and resting on the said first and second support members tilt into their respective compartments around the said first support member and are placed in delivery position for the film when the said compartment is brought into the extension of the optical axis of the projector.

In order that the invention may be more fully understood, one embodiment of a projector according to the invention is described below purely by way of illustrative and non-limiting example, with reference to the accompanying drawings in which:

FIG. 5 is a sectional view along the line V—V of FIG. 4, showing the device for extracting the film from the cassette;

FIG. 6 is a sectional view along the line VI—VI of FIG. 4, showing the film rewinding device.

Figure 2:
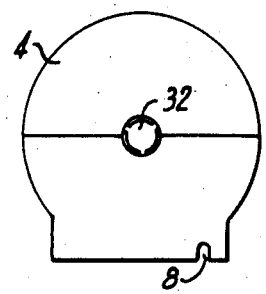
FIG. 2 is a view in elevation of one cassette.

The movie projector shown in the drawings comprises a light source 1 (FIG. 5), an objective 2, a film drive mechanism, not shown, a movable support 3 for cassettes 4 each containing a spool of film for projection, a temporary receiving member for the projected film, not shown, and a control mechanism for these devices.

The movable support 3 for the cassettes 4 is displaceable in the direction of the arrow F (FIG. 3) perpendicular to the optical axis A.O. of the objective 2. The support 3 comprises a succession of vertical compartments 5 juxtaposed in the direction of displacement F and open at their upper end.

Figure 1:
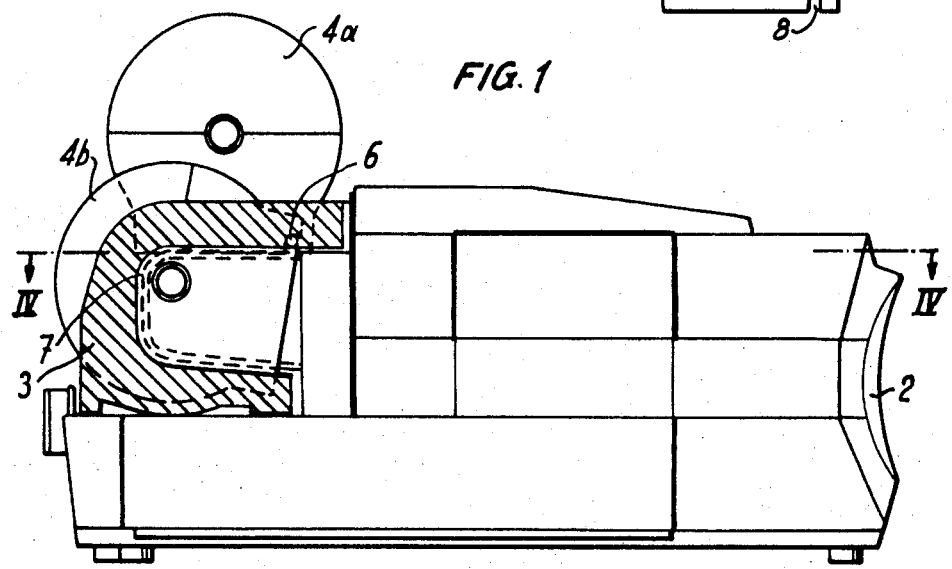
FIG. 1 is a diagrammatic view in side elevation showing two cassettes, in use position and in waiting position respectively.
Figure 3:
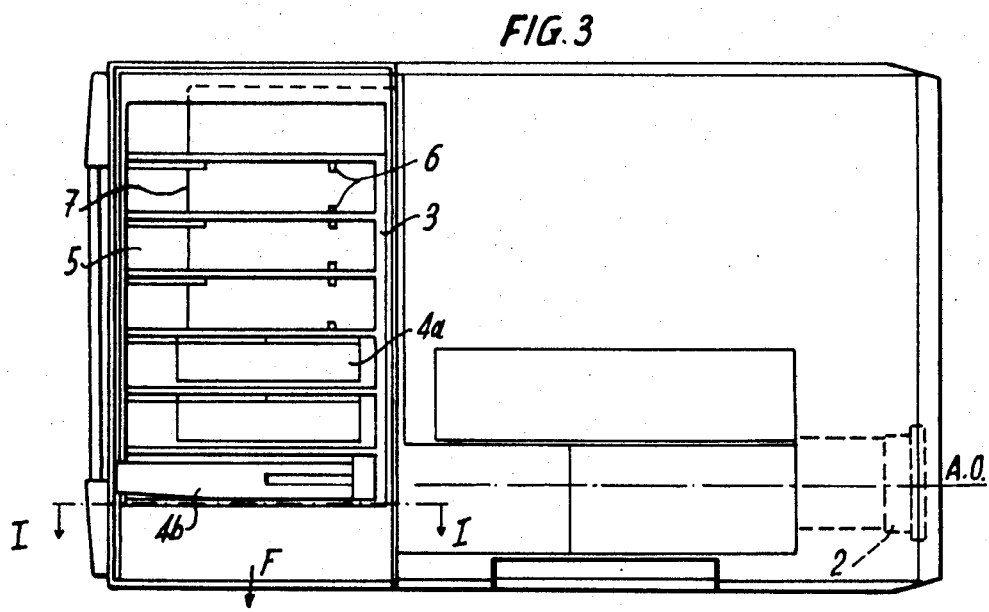
FIG. 3 is a view from above of the embodiment shown in FIG. 1.

As shown in FIGS. 1 and 3, the cassettes 4 occupy successively two positions 4a and 4b in the compartments 5 of the movable support 3. In their position 4a, called waiting position, the cassettes 4 rest, on one hand, on two pins 6 projecting facing one another in their respective compartment 5 at one of the ends of the open upper edge of the latter and, on the other hand, on a shoulder 7 of the frame of the projector forming a projection in the various compartments 5 of the movable support 3 as long as they do not occur in projection position for the film spool of the cassette 4 that they contain.

As shown in FIGS. 1 and 2, the cassettes 4 have at their base notches 8 by which they are supported, in their position 4a, on the said pins 6 of their respective compartment 5, whilst the remainder of their base rests on the shoulder 7 of the base of the projector. When their compartment 5 is brought into the extension of the optical axis A.O. of the objective 2, the cassettes pivot around the pins 6 due to the fact that their base is no longer supported by the shoulder 7 of the frame, and they then fall into their position 4b, called delivery position for the film 26 that they contain.

Figure 4:
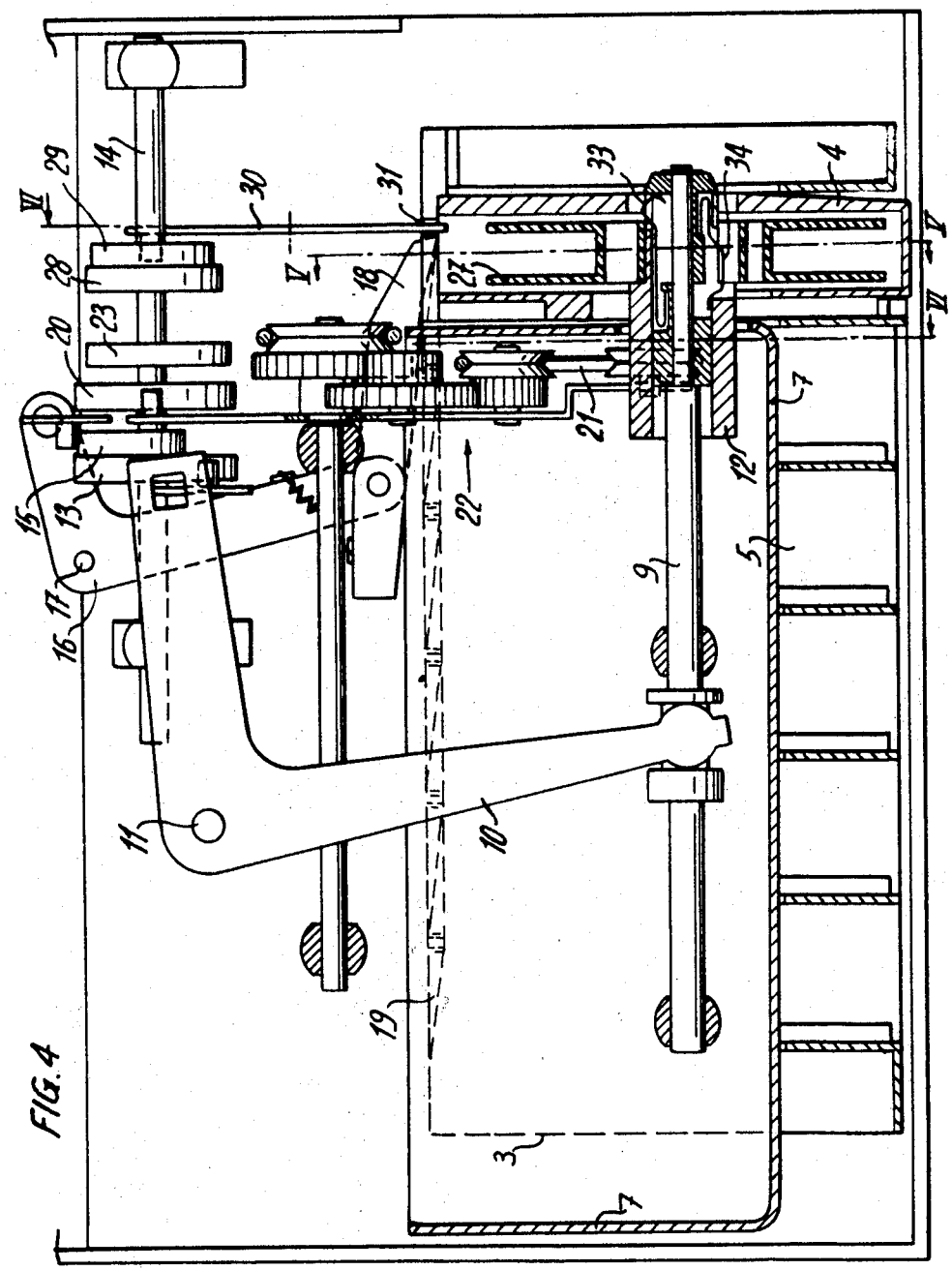
FIG. 4 is a sectional view along the line IV—IV of FIG. 1.

As shown in FIG. 4, the projector comprises a shaft 9 mounted in axially sliding manner in the shoulder 7 of the frame. The shaft 9 is oriented in the direction of displacement of the movable support 3 and arranged coaxially in the extension of the hub of the spool 27 occurring in position 4b for delivering film from the cassette 4. An angle lever 10, mounted on a pivot 11 actuates the withdrawal and insertion respectively of a bush 12 into the hub of the spool 27 in position 4b, this bush being mounted rotatably on the end of the shaft 9 adjoining the optical axis A.O. of the projector. This to-and-fro movement is actuated by a cam 13 rigidly fixed to a cam shaft 14. A cam 15, rigidly fixed to the same cam shaft 14, insures, by means of an angle lever 16 mounted on a pivot 17 and by a spring catch 18 of which the nose engages in the tooth of a rack 19 fixed to one of the longitudinal edges of the movable support 3, the step by step advance of the movable support 3.

Cam 20, also rigidly fixed to the cam shaft 14, ensures the placing in contact with a drive belt 21 of a cine-transmission 22, shown in FIG. 6, with a bush 12 mounted rotatably on the shaft 9. Cam 23, also rigidly fixed to the cam shaft 14, ensures the placing in contact of the drive belt 24 with a cine-transmission 25, shown in FIG. 5, with the free end of the film 26 wound on the hub of the spool 27 of the cassette 4 in delivery position 4b to extract therefrom the said free end of the film and direct it towards the film drive mechanism, not shown. Two other cams 28 and 29, also rigidly fixed to the cam shaft 14, ensure the opening and closing respectively of a film presser shutter, not shown, and the locking and the unlocking of the movable supports 3 in its successive projection positions by engagement of a bolt 30 in the corresponding notches 31 of the said movable support 3.

These various sequences of control of the mechanism of the projector by the cams 13, 15, 20, 23, 28 and 29 are effected in the course of one complete rotation of the cam shaft 14 in the following order:

The bolt 30 being withdrawn from the notch 31 of the movable support 3 by the cam 29, the cam 15 causes the movable support 3 to advance by one step thereby actuating the angle lever 16 which pushes the spring catch 18, of which the nose is engaged in the teeth of the rack 19, in the direction of the arrow F (FIG. 3). The bolt 30 is engaged in the notch 31 of the compartment 5 thus brought opposite it and the cassette 4 occurring in waiting position 4a in this compartment 5 pivots around the pins 6 so as to occupy its position of film delivery 4b by simple effect of gravity. At this moment, the axial orifice 32 of the spool 27 is facing the bush 12 of the sliding shaft 9. The cam 13 then actuates the angle element 10 which causes the shaft 9 to advance in the direction of the said cassette 4 in position 4a. The bush 12 is thus locked longitudinally and axially in the axial orifice 32 in the spool 27 in position 4a due to the spring tongues 33 and 34 respectively.

The cam 23 then causes the engagement of the drive belt 24 of the cine-transmission 25 with the free end of the film 26 that it extracts from the cassette 4 and which is directed by the guide tongue 35 towards the film drive mechanism, not shown. The cam 28 then actuates the closing of a film presser shutter, not shown, and the free end of the film 26 is taken up by a film receiving spool, not shown. The projection of the film contained in the cassette 4 in position 4b is effected in known manner. At the end of the projection, the tension of the film causes another rotation of the cam shaft 14. The cam 28 then actuates the opening of the film presser shutter, not shown. The cam 20 ensures the engagement of the drive belt 21 of the cine-transmission 22 with the bush 12 mounted rotatably on the shaft 9 and the film is rewound on the hub of the spool 27.

The cam 13 then causes the shaft 9 to withdraw by means of the angle lever 10 and the bush 12 is disengaged from the axial orifice 32 of the spool 27.

Finally, the cam 29 causes the unlocking of the movable support 3 by withdrawal of the bolt 30 from its notch 31. Another cassette 4 is then brought into film delivery position 4b by means of another advance by one step of the movable support 3 actuated as previously by the cam 15.

It should be noted that as long as cassettes 4 are in their waiting position 4a, it is possible to substitute others for them. There can thus, for example, be reprojected the film contained in a given cassette without having to wait until all the cassettes 4 occurring in waiting position on the movable support 3 have been projected, or again to substitute a new set of cassettes 4 for those which it had initially been intended to project, in the course of projection.

Obviously, there could be substituted for the advancing mechanism for the movable support of the cassettes other devices such as a drive by a tooth pinion, for example, and an electrical control device, for example, could be substituted for the cam controls for the various sequences of extraction, of driving and of rewinding of the film from the cassettes in projection position.

Although it is necessary that the cassette should be able to pivot from waiting position into use position, cassettes having another shape, having a different pivoting axis or of which the film is taken up by the projection mechanism in any other manner, can be utilised. Such cassettes can contain spools of different diameter. The pivoting of the cassettes, instead of being produced by effect of gravity, can be effected in a different manner, especially by mechanical means.

I claim:

1. In a cinematographic projector including a frame, a light source, an objective, a film drive mechanism, a movable support for film-containing cassettes, said support being displaceable horizontally in a direction perpendicular to the optical axis of the objective, said support including vertical compartments juxtaposed in the direction of displacement of the movable support, a temporary receiving member for the projected film and control mechanisms for said devices, the improvement wherein said movable support is provided with an open bottom, fixed supporting means for the cassettes disposed beneath said movable support, a projecting compartment provided at a level lower than said supporting means and in alignment with the optical axis of the projector, said supporting means extending adjacent said projecting compartment, pivoting means cooperating with the cassettes in said compartments to allow said cassettes to pivotally drop into said projecting compartment, in a position suitable for delivering their film when the corresponding compartment of the movable support moves above said projecting compartment.

2. A projector according to claim 1, wherein said pivoting means for the cassette of the said compartments comprises oppositely disposed pins on the side walls of said compartments, each said cassette having notches on their base portion, said pins engaging in said notches.

3. A projector according to claim 1, wherein the supporting means of the cassette comprises a shoulder on the frame of the projector.

4. A projector according to claim 1, including a locking and unlocking device for said movable support, and cam means controlling said locking device.

5. A projector according to claim 1, including an advance device for the movable support, and cam means controlling said advance device.

6. A projector according to claim 1, including rotatable means mounted on an axially slidable shaft and movable into and out of the hub of the spool of film in the cassette when said cassette is in position of film delivery, means controlling said movement, said control means including a rotatable shaft and a cam fixed thereto.

7. A projector according to claim 6, wherein said rotatable means includes means for locking it in position in the hub of the spool, a rewinding device for the film on the spool including means driving said rotatable means and cam means controlling said driving means.

8. A projector according to claim 4, wherein said cam is rigidly fixed to a driven shaft onto which at least one other cam is rigidly fixed.

9. A projector according to claim 5, wherein said cam is rigidly fixed to a driven shaft onto which at least one other cam is rigidly fixed.

10. A projector according to claim 6, wherein said cam is rigidly fixed to a driven shaft onto which at least one other cam is rigidly fixed.

11. A projector according to claim 7, wherein said cam is rigidly fixed to a driven shaft onto which at least one other cam is rigidly fixed.

* * * * *

UNITED STATES PATENT OFFICE
CERTIFICATE OF CORRECTION

Patent No. 3,751,148  Dated Aug. 7, 1973

Inventor(s) LOUIS THEVENAZ

It is certified that error appears in the above-identified patent and that said Letters Patent are hereby corrected as shown below:

In the heading of the patent, line 4, change "Balex International S.A." to --Bolex International S.A.--.

Signed and sealed this 18th day of December 1973.

(SEAL)
Attest:

EDWARD M. FLETCHER, JR.　　　　　RENE D. TEGTMEYER
Attesting Officer　　　　　　　　Acting Commissioner of Patents